Aug. 14, 1928.
F. E. WOLCOTT
1,681,142
HEATING APPLIANCE
Filed July 6, 1926
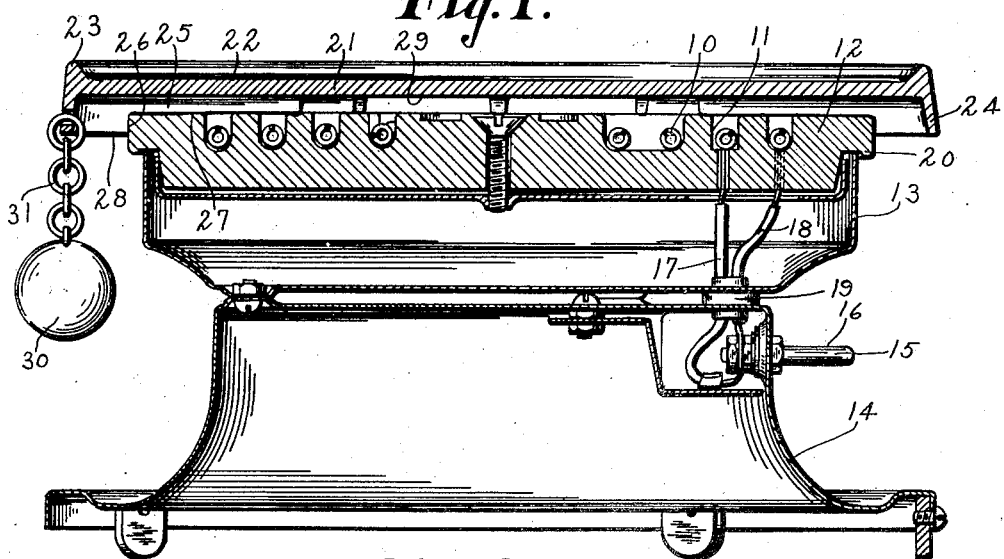
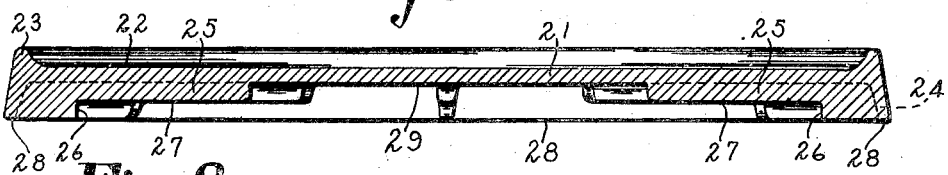
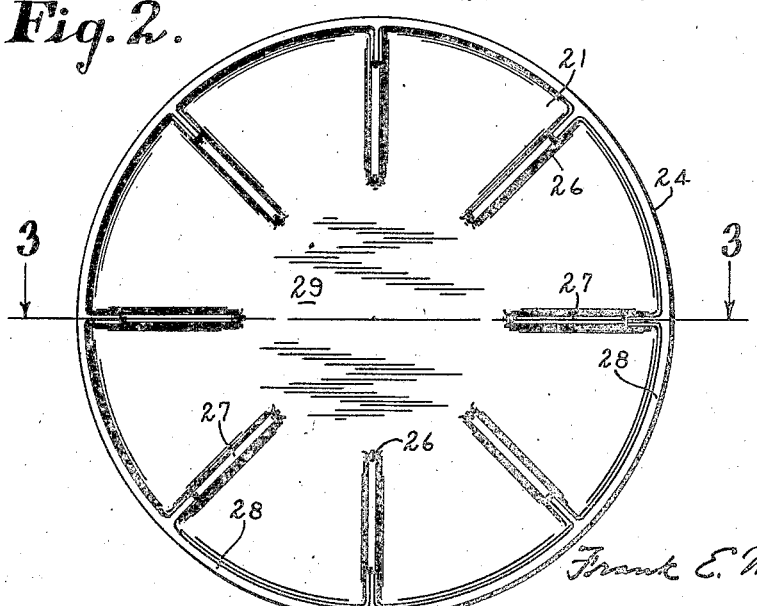
Inventor
Frank E. Wolcott
By Horace L. Rockwell
Attorney Patented Aug. 14, 1928.

1,681,142

UNITED STATES PATENT OFFICE.

FRANK E. WOLCOTT, OF WEST HARTFORD, CONNECTICUT, ASSIGNOR, BY MESNE ASSIGNMENTS, TO THE BEARDSLEY & WOLCOTT MFG. CO., A CORPORATION OF CONNECTICUT.

HEATING APPLIANCE.

Application filed July 6, 1926. Serial No. 120,713.

My invention relates to heating appliances.

It has among its objects to provide an improved and simplified culinary utensil especially adapted to use in connection with table stoves, and, more particularly, with electrical table stoves and capable of being manufactured at small expense. Further objects of my invention include the provision of such an improved utensil having improved means for supporting and locating the same above the heated surface of the stove which make it cooperate with the stove in an improved manner and also enable the utensil to be very conveniently applied to or removed from the stove. These and other objects and advantages of my improved construction will, however, hereinafter more fully appear.

In the accompanying drawings, I have shown for purposes of illustration one embodiment which my invention may assume in practice.

In these drawings:

Fig. 1 is a sectional view of an electrical stove and culinary utensil embodying the features of my invention;

Fig. 2 is a bottom plan view of the culinary utensil shown in Fig. 1, and

Fig. 3 is a section on line 3—3 of Fig. 2.

The device selected for illustrating the features of my invention, is an electrical stove invented by one Hugo Frank and suitable for use upon a table or the like, wherein the heating element comprises the coiled resistance wire 10, suitably arranged in the grooves 11 of the holder or brick 12, composed of suitable refractory insulating material. The heating element is suitably supported upon a sub-base 13 by inner peripheral supports (not shown) and the sub-base 13, in turn is supported by the base 14. Terminal posts 15 and 16 are secured to the base 14 and electrically connected to the ends of the wire 10 by means of leads 17 and 18, respectively, which thread through suitable insulating bushings 19. The posts 15 and 16 are adapted to be engaged by any well known type of connecting plug. The heating element is illustrated as being circular in form with the peripheral edge 20 thereof extending slightly beyond the periphery of the sub-base 13. Heating elements of other than circular form and stoves of other constructions may be employed without departing from the principles of the invention.

My improved culinary utensil, though capable of assuming various forms while embodying my invention, as illustrated is of a form generally known as a griddle plate for use in cooking pancakes or like foods. The plate 21 has a smooth flat upper surface 22, which curves gradually upwardly at the periphery of the plate to provide a flange 23. The plate 21 extends peripherally downwardly to form a depending peripheral flange 24. A plurality of ribs 25 extend radially inwardly from the flange 24 toward the center of the plate 21, terminating intermediate the periphery and the center thereof.

Each of the ribs 25 is shouldered at 26 so as to provide a surface 27 on each rib, which is spaced upwardly from the lower edge 28 of the flange 24. The surface 27, therefore, is intermediate the lower edge 28 of the flange 24, and the under-surface of the plate 21. The diameter across the plate 21 between opposite shoulders 26 is substantially the same as the diameter of the holder 12 at corresponding points on its periphery, so that the plate seats over the heating element with the surface 27 of each rib resting upon the upper surface thereof and the shoulders 26 abutting laterally the peripheral edge of the holder.

By means of the shoulders 26 the plate 21 is self locating with respect to the holder 12, and will not slide from the same, and the smooth flat surface 22 of the plate will be properly located in efficient heating position above the heating element. The ribs 25 at the portion having the surfaces 27, space the under surface 29 of the plate from the upper surface of the heating element to provide an air space therebetween of sufficient volume to permit the efficient transmission of heat to the plate and to assist in the even distribution thereof over the surface of the plate. Due to the above structure of the plate 21, there is an air space about the periphery thereof between the flange 24 and the periphery of the holder 12, permitting a circulation of air therebetween.

While the plate 21 has been shown and described as a pancake griddle or the like, any culinary utensil may be similarly provided with an under surface or bottom, having the above described novel features whereby the same advantages will be obtained in the use thereof. Culinary utensils having such features embodied in their structure, may be readily located upon the heating element and efficiently heated thereby. In addition to the above results obtained by the provision of the ribs 25, the plate 21 is strengthened and warping or other distortion of the same, due to the action of the heat thereon, is prevented, whereby the utensil will retain its shape and not require occasional replacement.

The plate 21 is provided with lifting means, comprising the ball 30 which is secured to the flange 24, by means of the chain 31. By means of the ball 30 the plate may be conveniently removed from the heating element, and when in a heated condition this may be accomplished without the necessity of handling an uncomfortably warm article.

While I have shown and described a preferred embodiment of my invention, it will be understood that it is not to be limited to all the details shown but is capable of modification and variation within the spirit of the invention and the scope of the appended claims.

What I claim is:

1. A culinary utensil having a bottom, said bottom having radially disposed ribs depending therefrom and having their inner ends spaced from the center of said bottom and said ends forming an inner utensil centering means beneath the bottom.

2. A culinary utensil having a bottom, said bottom having radially disposed ribs depending therefrom and having their inner ends forming an inner utensil centering means and said bottom also having more shallow utensil supporting and spacing means within said centering means.

3. A culinary utensil having a bottom, and a plurality of depending ribs upon said bottom having portions between their ends forming utensil centering means and each provided with an inner portion of reduced height forming a utensil support within said centering means.

4. A culinary utensil having a bottom, and a plurality of depending ribs extending inwardly from adjacent the periphery of said bottom to form inner utensil centering means and having inner portions of reduced height forming supporting means terminating substantially short of the center of said bottom.

5. A culinary utensil having a substantially flat bottom, and a plurality of ribs on said bottom, the under surface of the inner ends of said ribs being parallel with the surface of said bottom and forming a support and the remainder of said ribs being deeper than said inner ends and forming centering means.

6. A culinary utensil having a substantially flat bottom, and a series of radial ribs depending from said bottom, the under surface of the inner ends of said ribs being parallel with the surface of said bottom and provided with depending abutments at their outer ends forming centering means.

7. A culinary utensil having a substantially flat bottom provided with depending widely separated ribs extending inwardly from its periphery, said bottom having wide unobstructed surfaces therebetween and said ribs terminating substantially short of the center of said bottom and being disposed around a large unobstructed center surface.

8. A culinary utensil having depending radial ribs on its bottom forming supporting means, said supporting means being spaced substantially from the center of the bottom and the latter having an unobstructed surface of large area surrounded thereby and unobstructed surfaces of large area extending in between said ribs.

9. A culinary utensil having on its bottom depending radial ribs having their inner ends cooperating to form centering means and more shallow radial supporting ribs inside said centering means, said supporting ribs terminating substantially short of the center of the bottom and the latter having an unobstructed surface of large area surrounded thereby and unobstructed surfaces of large area also extending in between said ribs.

10. In a culinary utensil, a bottom portion having a plurality of depending ribs upon the under surface thereof and extending inward thereon including ribs forming utensil centering means and ribs extending inward beyond said centering means ad more shallow than said first mentioned ribs forming a utensil support within the socket formed by the latter.

11. In a culinary utensil, a bottom portion having a plurality of radially extending ribs depending from the under surface thereof extending inwardly from the outer periphery of said bottom portion and terminating substantially short of the center thereof, the inner end of each of said ribs forming utensil centering means and the outer ends thereof being connected by a flange depending from said bottom.

12. In a culinary utensil, a bottom portion having a plurality of radially extending ribs depending from the under surface thereof, each of said ribs presenting an inwardly directed shoulder intermediate its ends.

13. In a culinary utensil, a bottom portion and a plurality of ribs upon the under side of said bottom extending radially and inwardly from its periphery, the inner portions of certain of said ribs being of less height than the outer portions of others and said several inner ends cooperating to form a lower utensil supporting means within an outer utensil centering means.

14. In a culinary utensil, a bottom portion having a depending flange about the periphery thereof, and a plurality of ribs upon the underside of said bottom extending radially and inwardly from said flange, the inner portions of said ribs being of less height than the outer portions thereof and having an inwardly directed shoulder disposed at the jointure between said rib portions.

15. In combination with a flat heating element of a heat producing device, a plate member having a plurality of ribs depending from the under surface thereof, said ribs being of such reduced height at their inner ends as to form a socket for said heating element.

16. In combination with a flat heating element of a heat producing device, a plate member having a plurality of ribs depending from the under surface thereof, and adapted to seat upon said heating element, each of said ribs being provided with an inwardly facing shoulder, said shoulders being adapted to engage said element at its periphery.

17. In combination with a flat heating element of a heat producing device, a plate member having means upon its under surface engageable with said element to space the under surface of said plate member from the top of said element to form an air space therebetween, and means extending inward upon the bottom of the plate member and terminating substantially short of the center thereof having their inner ends forming utensil centering means for said element engageable with the side thereof.

18. In combination with a flat heating element of a heat producing device, a plate member having means upon its under surface engageable with the upper surface of said element to space the plate member from the top of said element, and radially disposed depending members extending inward from the periphery of said plate and having their inner ends forming utensil centering means engageable with the periphery of said heating element.

19. In combination with a flat heating element of a heat producing device, a plate member having radial means upon its under surface engageable with the upper surface of said element to space said plate member from said element, and radial means adapted to engage the periphery of said element to locate said member with respect to said element.

20. In combination with a flat heating element of a heat producing device, a plate member having means to space the under surface thereof from the top of said element and means to locate the same transversely with respect thereto and engageable with the side thereof, said latter means extending radially inward from the plate periphery and being disposed in concentric relation to said first mentioned means and cooperating therewith to form a socket surrounding said top spacing means and receiving said element.

21. In combination with a flat heating element of a heat producing device, a plate member having a plurality of radially extending ribs adapted to space the under surface of said member from the top of said element to form an air space therebetween, and radially disposed depending means deeper than said ribs engageable with the side of said element and acting to locate the member transversely with respect to the latter.

22. In combination with a flat heating element of a heat producing device, a plate member having means to space the under surface thereof from said element, and inwardly directed depending means adjacent the periphery of said plate member adapted to engage the periphery of said element to locate said member with respect thereto.

23. In combination with a flat heating element of a heat producing device, a plate member having a plurality of radially extending ribs adapted to space the under surface of said member from said element to form an air space therebetween, and an inwardly directed shoulder-like projection upon each rib adapted to engage the periphery of said element to locate said member with respect thereto.

24. In combination with an electrical stove or the like having supporting means for a culinary vessel, a culinary vessel supported by said means, said vessel having means adjacent its periphery to abut laterally the supporting means to locate the vessel upon the stove and means arranged within said locating means and spacing the vessel bottom from said supporting means said spacing means being substantially spaced from one another and from the center of the vessel bottom by unobstructed bottom areas.

25. In combination with an electrical stove or the like having supporting means for a culinary vessel, a culinary vessel supported by said means, and inwardly extending ribs on the under surface of said vessel to abut laterally against the supporting means to locate the vessel relatively to the stove.

26. In combination with an electrical stove or the like having a heat element holder, a culinary vessel adapted to rest on said holder, the dimensions of said vessel being greater than those of the holder so that the former projects laterally beyond the latter, and radially disposed ribs on the bottom of the vessel and extending inwardly from the periphery thereof to abut the lateral edge of the holder.

27. A culinary utensil having a bottom, said bottom having a depending flange about the periphery thereof, and a handle therefor, said handle comprising a chain secured to said flange, and a ball shaped member secured to the free end of said chain.

28. A culinary utensil having a bottom, said bottom having a depending flange about the periphery thereof, and flexible handle means depending from said flange.

In testimony whereof I affix my signature.

FRANK E. WOLCOTT.